(12) United States Patent
Jackson

(10) Patent No.: US 7,527,728 B2
(45) Date of Patent: May 5, 2009

(54) BIOMASS CARRIER PROMOTING SIMULTANEOUS NITRIFICATION-DE-NITRIFICATION

(76) Inventor: David Jackson, 2430 Meadowland Drive, Victoria, British Columbia (CA) V8Z 5P4

(*) Notice: Subject to any disclaimer, the term of this patent is extended or adjusted under 35 U.S.C. 154(b) by 0 days.

(21) Appl. No.: 11/754,350

(22) Filed: May 28, 2007

(65) Prior Publication Data

US 2007/0284294 A1 Dec. 13, 2007

(30) Foreign Application Priority Data

Jun. 7, 2006 (CA) .................................. 2550121

(51) Int. Cl.
*C02F 3/10* (2006.01)
(52) U.S. Cl. .................. 210/150; 210/541; 210/617; 261/DIG. 72; 428/402
(58) Field of Classification Search ............ 210/150, 210/151, 616, 617, 541; 261/94, DIG. 72; 428/402; 435/180, 299.1
See application file for complete search history.

(56) References Cited

U.S. PATENT DOCUMENTS

| | | | | |
|---|---|---|---|---|
| 3,112,261 A * | 11/1963 | Porter et al. | .................. | 210/615 |
| 3,957,931 A * | 5/1976 | Ellis et al. | .................... | 210/150 |
| 4,122,011 A * | 10/1978 | Strigle, Jr. | ................... | 210/150 |
| 4,382,046 A * | 5/1983 | Frohwerk | ............ | 261/DIG. 72 |
| 4,385,988 A * | 5/1983 | Hypponen | ................. | 210/150 |
| 4,490,312 A * | 12/1984 | Furr | ................... | 261/DIG. 72 |
| 5,304,423 A * | 4/1994 | Niknafs et al. | .............. | 428/402 |
| 5,543,039 A * | 8/1996 | Odegaard | ................... | 210/150 |
| 5,985,148 A * | 11/1999 | Liu | ............................. | 210/605 |
| 6,153,094 A * | 11/2000 | Jowett et al. | ................. | 210/151 |
| 6,241,222 B1 * | 6/2001 | Lang | ........................... | 261/94 |
| 7,189,323 B2 * | 3/2007 | Lofqvist et al. | ............. | 210/615 |
| 2008/0093751 A1 * | 4/2008 | Miller et al. | .................. | 261/94 |

* cited by examiner

Primary Examiner—Christopher Upton
(74) Attorney, Agent, or Firm—J. Gordon Thomson

(57) ABSTRACT

The invention is a biomass carrier used in the biological purification of waste water. The design of the biomass carrier is characterized by a surface morphology designed to produce a specific pattern of variations in bio-film thickness, resulting in optimized bio-film conditions for simultaneous nitrification-de-nitrification and biodegradation of trace organic contaminants.

8 Claims, 3 Drawing Sheets

BIOMASS CARRIER PROMOTING SIMULTANEOUS NITRIFICATION-DE-NITRIFICATION

FIELD OF THE INVENTION

This invention relates to the field of water and wastewater treatment, and particularly to a biomass carrier promoting simultaneous nitrification and de-nitrification of wastewater such as primary and secondary effluents from domestic and industrial wastewater sources.

BACKGROUND OF THE INVENTION

As described in pending patent applications such as US2005072732 and US2003127378, various biomass carriers have been designed for use in biological waste water treatment systems. These carriers are contained within a biological reactor vessel and are maintained in a fluidized or constant motion state. Since the biomass carriers are in constant motion, they will collide with each other. Hence the carriers have protected surfaces, typically inside surfaces, that are not exposed to collisions. The reactor vessel receives waste water that may be aerated or oxygenated to support aerobic biological processes useful in the treatment of waste water. The biomass carriers are used to provide an anchorage or substrate to support populations of micro-organisms. These micro-organisms form a bio-film over the protected surfaces of the carriers. The bio-film organisms react with the waste water and remove organic pollutants from the water so that outflow from the reactor vessel has a lower concentration of organic contaminants. One advantage of using biomass carriers in reactor vessels is that the size of the vessel can be reduced.

Biomass carriers are typically designed to maximize the protected surface for maximum bio-film growth while keeping the overall volume of the carrier to a minimum. This has the result of maximizing biological treatment of waste water with an optimally dimensioned carrier. The prior art reveals a wide variety of carrier shapes including extruded plastic shapes with radial fins and/or concentric rings, multi-cellular (foam) shapes and composite shapes consisting of a framework material with another high surface area material attached to the framework. However, there is a practical limit to the ratio of protected surface area to volume in biomass carrier design. Since the biomass carrier relies upon effluent flow through the inside surfaces supporting the bio-film, increasing the volume of these inside surfaces in an effort to maximize biological treatment has the deleterious effect of minimizing flow channels through the biomass carrier thereby reducing the volume of waste water flow through the carrier. The smaller flow channels are prone to clogging and cannot provide sufficient waste water flow over the bio-film for efficient treatment.

The known art also teaches the use of biomass carriers to enhance nitrogen conversion and removal. Biomass carrier systems have been employed for nitrification (conversion of ammonia to nitrate) and de-nitrification (conversion of nitrate to nitrogen gas). Nitrification occurs primarily in aerobic (oxygen-rich) conditions while de-nitrification requires anoxic conditions as well as a substance (such as organic compounds) to act as an electron acceptor.

The accepted chemistry for nitrification and de-nitrification is as follows:

$$NH_4^+ + 1.5\, O_2 \rightarrow NO_2^- + 2H^+ + H_2O \quad (1)$$

$$NO_2^- + 0.5\, O_2 \rightarrow NO_3^- \quad (2)$$

$$2\, NO_3 + 10H^+ + 10e^- \rightarrow 2\, OH^- + 4\, H_2O + N_2 \quad (3)$$

Summary: $2NH_4^+ + 4\, O_2^- + 10e^- + 6H^+ \rightarrow 2\, OH^- + 6H_2O + N_2$ While nitrification and de-nitrification in wastewater treatment is usually a sequential aerobic/anoxic process with each step implemented in separate reactor vessels or compartments and some form of recycle between the vessels or compartments employed, the art indicates that there have been efforts to stimulate simultaneous nitrification-de-nitrification in biological treatment systems. This is known as SNdN in the waste water treatment industry. A paper by the engineering firm Black and Veatch describes the somewhat unexpected contribution of SNdN to nitrogen removal in an Integrated Fixed-film Activated Sludge (IFAS) system employing biomass carriers ("Pilot Scale Performance of the MBBR process at the Crow Creek WWTP" J. P. McQuarrie and M. Maxwell, WEFTEC 2003). In these "hybrid system" applications, SNdN occurrence has been attributed to the presence of anoxic micro-sites within a generally aerobic environment. SNdN has considerable advantages over the traditional two step sequential nitrification-de-nitrification process because it conserves alkalinity, requires less oxygen and hence less process energy, as shown by the chemistry below:

$$NH_4^+ + 1.5\, O_2 \rightarrow NO_2^- + 2H^+ + H_2O \quad (1)$$

$$2\, NO_2^- + 6H^+ + 6e^- \rightarrow 2\, OH^- + 2H_2O + N_2 \quad (2)$$

Summary: $2NH_4^+ + 3O_2 + 6e^- + 2H^+ \rightarrow 2OH^- + 4H_2O + N_2$

My review of the known art indicates biomass carrier design for optimizing SNdN is wanting. Some efforts have relied upon the use of multi-porous media such as foam to contain anoxic and anaerobic micro-sites even when the waste water contains high levels of dissolved oxygen. However, for a carrier to have effective SNdN the anoxic and aerobic micro-sites must be in close proximity to establish efficient transport of nitrite between the nitrification sites and the de-nitrification sites. SNdN in systems with multi-porous (foam) type media consistently fail to exceed 30% reduction in total nitrogen. One reason is that these foam carriers tend to produce an aerobic outer layer and a massive internal anaerobic layer. The result is limited potential for producing the necessary anoxic sites and severe mass transfer limitations caused by clogging of passages between the aerobic and anoxic zones. In addition, these media have operational complications such as the need to periodically squeeze the biomass out of the foam to restore porosity. As a result of such operational drawbacks, the use of extruded and to a lesser extent, injection-moulded plastic biomass carriers has been much more extensive in the industry.

It should be noted that in the field of biomass carriers, certain commonly used comparative parameters have limitations that can lead to erroneous assumptions about performance. The most commonly cited biomass carrier characteristic is called the "specific surface area". This is a measure of the total surface area of the carrier per unit volume of the carrier when the carrier is random-packed in a dry state. Derivatives of this parameter include "protected surface area" which deducts areas exposed to carrier-carrier and carrier-vessel collisions where the bio-film would not likely survive. The collision areas are deemed to contribute little to the overall performance of the biomass carrier. Dry packing efficiencies vary with carrier design. Carrier performance is best indicated by the total protected surface area per volume of bioreactor. The total surface area of a carrier is determined by the maximum fill fraction of the carrier that is consistent with adequate carrier motion and circulation in the bioreactor. Some commercial biomass carriers have a maximum fill fraction of about 65-70%. With protected surface area values of 400 to 500 square meters per cubic meter this yields a maximum in-service specific protected surface area of 260 to 350 square meters per cubic meter. Considering the wide range of biomass carrier designs, these maximum in-service specific protected surface area values are not necessarily proportional to dry-packed specific surface area values. The protected surface area values are influenced by hydro-dynamic characteristics within the reactor such as carrier interactions with air bubbles, tendencies for carriers to "bridge" and other factors too complex to predict accurately with available hydro-dynamic and mixing models.

For a biomass carrier to be effective for SNdN, the bio-film it supports must have aerobic and anoxic sites in close proximity for the efficient transfer of nitrites between them. The levels of dissolved oxygen in waste water required for SNdN will be lower than is optimal for nitrification and higher than is optimal for de-nitrification. SNdN has been observed to be considerably more prominent and consistent in biomass carrier systems operating in hybrid Integrated Fixed-film Activated Sludge (IFAS) mode. These have achieved approximately 40% reduction in total nitrogen. In these hybrid systems large concentrations of suspended biological flocs (typical of the Activated Sludge process) coexist with the biomass carriers and compete for oxygen and substrate. It has been observed that populations of nitrifying bacteria are higher as a proportion of total flora in the bio-film compared with the suspended populations. It is thought that in these hybrid systems, anoxic sites are more prevalent than in pure biomass carrier systems because of the lower dissolved oxygen levels in the region of the bio-film due to competition from suspended biomass and the greater degree of bio-film masking by suspended particulate matter. SNdN occurrence in these hybrid applications has been observed to be inconsistent and not reliable for process design purposes. Further, it suffers from the requirement for sub-optimal dissolved oxygen levels, resulting in an excessive sacrifice of primary treatment performance.

Bio-film growth and morphology is complicated and affected by a large number of factors. However a few general principles apply:

(1) Bio-film thickness is generally positively correlated with the specific organic loading rate, that is, the mass of organic matter applied to the bioreactor per total protected surface area of carriers; bio-films in applications with low loading rates and predominantly lower metabolic potential (such as separate stage nitrification) are noted to exhibit particularly thin bio-films;

(2) Anoxic micro-sites are more likely to occur in thicker bio-films and will be preferentially located closer to the carrier surface;

(3) Bio-films tend to "smooth out" surface irregularities, prominences, crevices and angles that are of a scale comparable to or smaller than that of the biomass thickness; and, (4) Bio-films in more protected areas will on average be thicker than those in more exposed locations. For example, areas exposed to carrier-carrier collisions will be very thin because of the physical attrition effect. Similarly, bio-films in areas exposed to lower bulk fluid velocities will on average be thicker than those in areas exposed to high velocities. This is partly due to the fact that bio-film sloughing is encouraged by high velocities.

To date, biomass carriers as well as other secondary treatment technologies have been employed for the removal of generalized organic content measured by biochemical oxygen demand (BOD) and chemical oxygen demand (COD) as well as nutrients such as various species of Nitrogen and Phosphorus. Increasingly, attention is focussed on a new class of pollutants known as "trace organic contaminants" such as pharmaceutical residuals. The ability to address these contaminants will be crucial in future waste water treatment systems. Recent studies have recognized that removal of these contaminants is considerably more efficient in a biological system with a high sludge age and heterogeneous populations.

Therefore there is a requirement for an improved biomass carrier-based system of waste water treatment that can consistently produce similar or better nitrogen removal efficiencies as has been noted to be achieved (episodically) by hybrid systems. The new method should preferably not rely on the presence of suspended biological matter. There is also a requirement for an improved system of waste water treatment that is adapted for the removal of trace organic contaminants.

SUMMARY OF THE INVENTION

In accordance with the present invention a biomass carrier is provided having characteristics optimized for SNdN. One object and advantage of the biomass carrier of the present invention is that it has an increased capability for metabolizing a wider array of contaminants including trace organic contaminants. Another objective and advantage of the present invention is that it will have a lower sludge yield.

The biomass carrier of the present invention is characterized by a unique surface morphology designed to produce a specific pattern of variations in bio-film thickness, resulting in optimized bio-film conditions for SNdN. In addition, the surface morphology is set and replicated in a geometric profile that optimizes the productivity of the in-service protected surface area.

The invention is an extruded plastic carrier design characterized with a novel "rounded rectangle" profile and parallel vertical partitions that exhibit the specific surface morphology. The carrier profile is larger than most commercially available media and may be cut to a variety of lengths.

The carrier will develop (on average) a thicker, older and more heterogeneous bio-film than common commercial carriers and will achieve higher rates of SNdN, metabolize a wider array of pollutants and have a lower sludge yield.

The carrier is employed to greatest advantage in BOD reduction applications where SNdN is desired. It is also an advantageous carrier to use in cold climate nitrification applications where the high specific surface area and numerous well protected attachment sites will assist the rapid development of a nitrifying bio-film and the maintenance of a larger nitrifying population than would be achieved with conventional carriers. Further, it is advantageous to use in applications where more complete removal of trace organic contaminants is desired.

DETAILED DESCRIPTION OF THE PREFERRED EMBODIMENT

Figure 1:
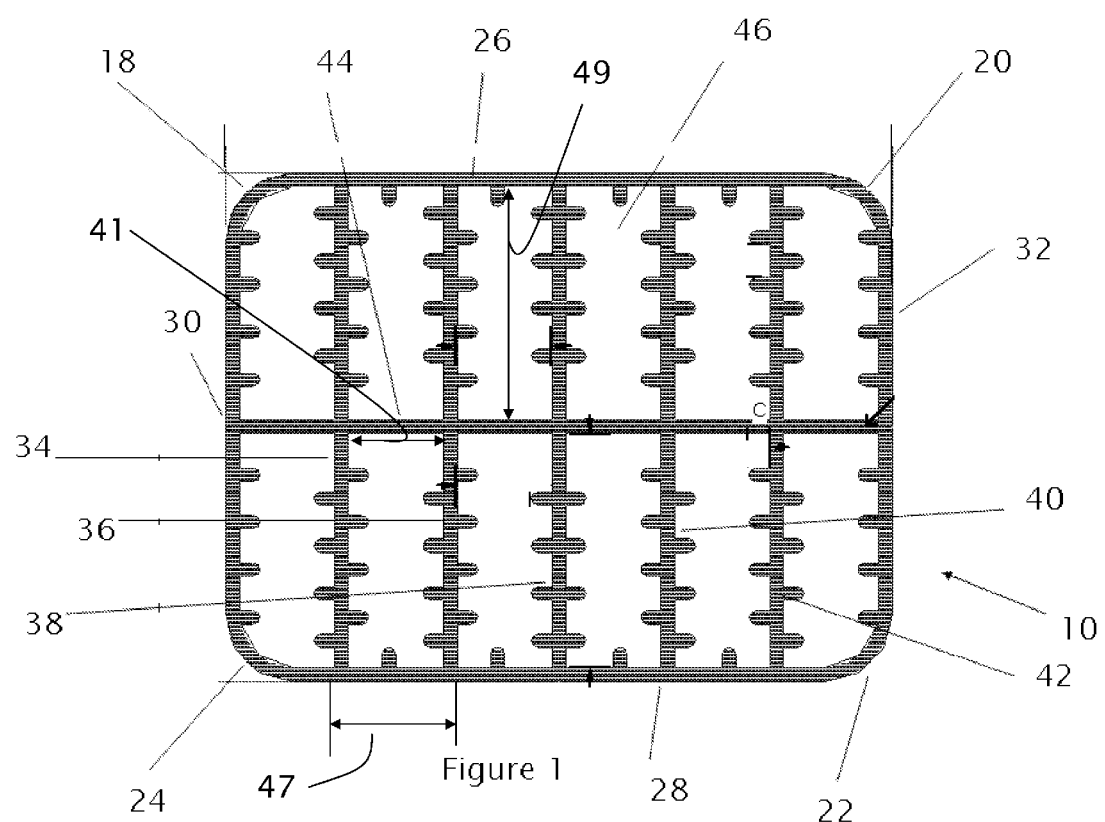
FIG. 1 is a cross-sectional view of a preferred embodiment of the biomass carrier of the present invention.

Referring now to FIG. 1, there is shown the proposed design for my invention (10) depicted in cross section. As illustrated, the biomass carrier (10) of my invention consists of a specific geometric design of the carrier framework.

Figure 3:
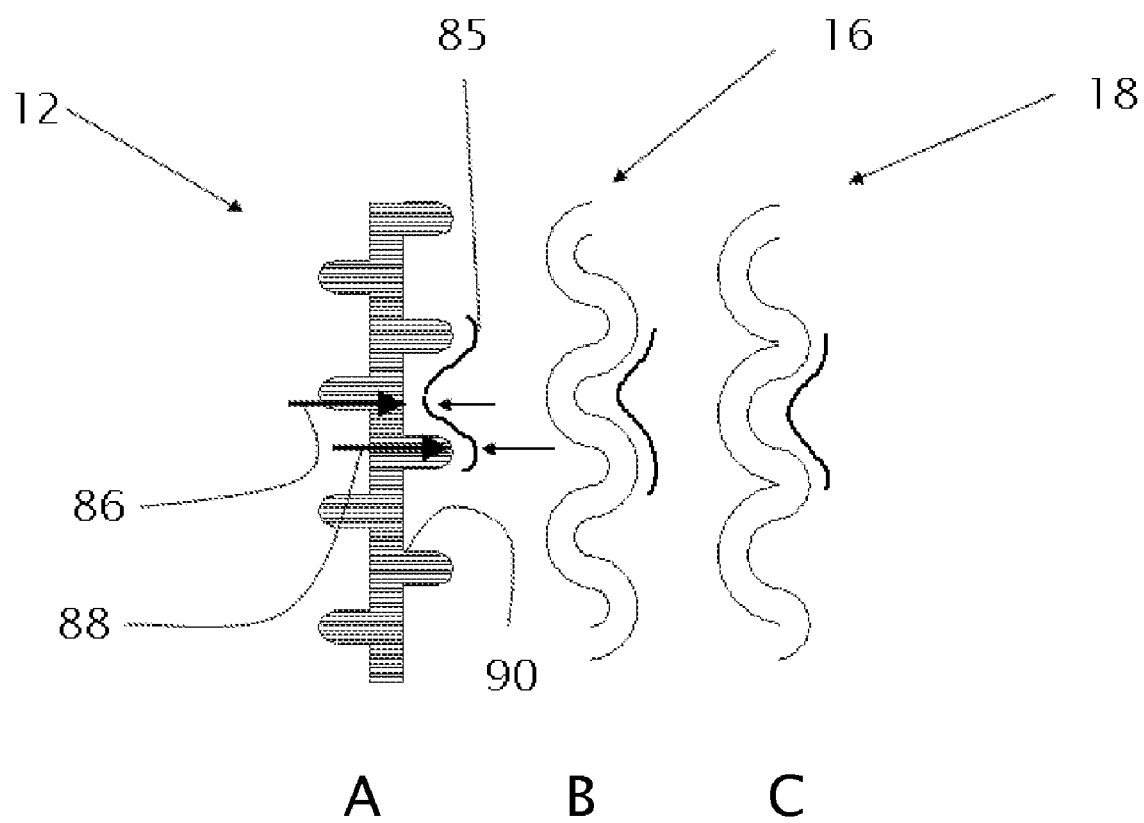
FIG. 3 is a view of three possible morphologies of the biomass carrier labelled A, B and C with morphology A being the preferred embodiment.

Referring now to FIG. 3, there is illustrated the specific morphology for the surfaces (12), (14), and (16) of the biomass carrier illustrated in FIG. 1.

FIG. 1 depicts the preferred embodiment of the biomass carrier (10) using surface morphology pattern (12). However, the biomass carrier could accommodate any of the alternative patterns (14) or (16) depicted in FIG. 2.

The profile of the preferred embodiment of the biomass carrier (10) has a substantially hollow rectangular body with rounded corners (18), (20), (22) and (24). For the sake of reference, the biomass carrier comprises four walls: top (26), bottom (28), left (30) and right (32). The body is hollow to permit mass transfer therethrough. Inside these four walls are equally spaced vertical parallel partitions (34) (36), (38), (40) and (42) and a single transverse support member (44). The intersection of the partitions and the support member results in the formation of a plurality of cells (46) within the carrier body (10) having a reticulated matrix pattern. The distance (41) between the vertical parallel partitions is uniform. In other embodiments of the invention there may be additional parallel partitions and transverse support ribs to provide appropriate control on the dimensions of the cells (46) according to production methods and requirements. The cells have a width (47) and a length (49).

Figure 2:
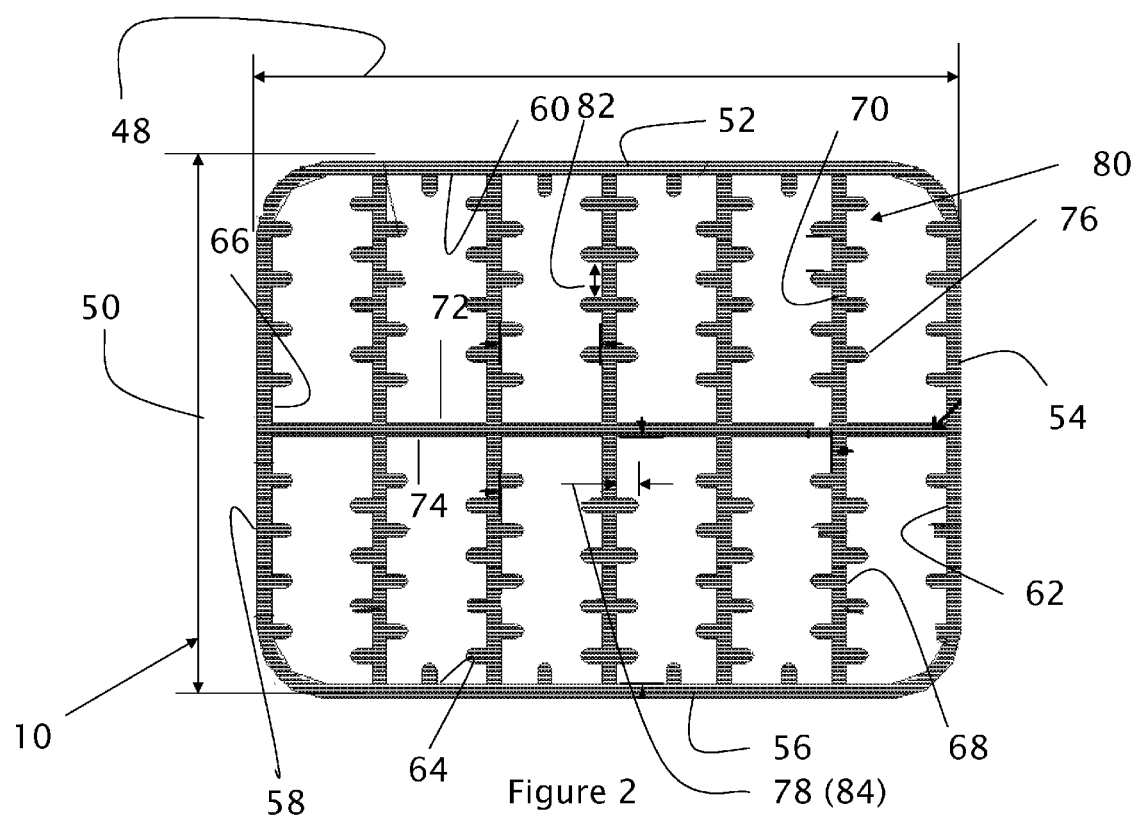
FIG. 2 is the same view as FIG. 1.

Referring now to FIG. 2 which is the same figure as FIG. 1, the biomass carrier (10) further comprises a width (48) and a height (50). The biomass carrier also has a predetermined thickness which is not illustrated in FIG. 1. Each of the four walls has an outside surface (52) to (58) and an inside surface (60) to (66). Each of the parallel partitions has two parallel surfaces (68) and (70). The transverse support rib also has two parallel surfaces (72) and (74). Located on each of the inside surfaces of the walls and the parallel surfaces of the parallel partitions are a plurality of equally spaced projections (76). These projections are integral to the walls, have rounded tips and a height (78) and are separated by separations (80) having a width (82) and a depth (84) equal to the height (78) of the projections (76). They depend inwards from the walls, that is, towards the interior of the cells.

Referring to FIGS. 1, 2 and 3, there are a number of considerations for determining the above-identified design characteristics of the preferred embodiment of my biomass carrier. Consider, first the surface morphology of the biomass carrier as that most directly influences its SNdN capabilities. The biomass carrier design must allow for the highest bulk liquid dissolved oxygen level consistent with maintaining appropriate anoxic micro-sites. In my biomass carrier there are alternating projections (76) and recesses (80) across the previously identified inside surfaces of the cells of the carrier. Upon these surfaces, the biomass in the form of a bio-film (85) grows so as to establish a relatively thick layer (86) in the recesses (80) and a thinner layer (88) over the projections (76).

The bio-film thickness on conventional biomass carriers in conditions anticipated for this invention would be expected to be in the range of 0.3 mm to 0.8 mm, with a typical value of 0.5 mm. With the present invention and under similar operating conditions, the bio-film thickness (86) in the separation areas will be considerably thicker than this, ranging from 0.6 mm to 1.3 mm while the thickness (88) of the bio-film in the projection areas is expected to be close to the typical value of 0.5 mm. Consequently, my biomass carrier will carry more biomass than an equivalent projected area of a conventional (flat) carrier surface under the same operating conditions. In addition, bio-film in well protected separation areas (80) will tend to slough at a slower frequency than projection areas (76) allowing the development of an older bio-film with higher autotroph populations (to facilitate nitrification) as well as anoxic regions to promote de-nitrification.

The depth and width and shape of separations must be optimized to balance several considerations:
(1) tendency to slough biomass, thereby affecting bio-film depth and age;
(2) oxygen diffusion;
(3) substrate transport between aerobic and anoxic conditions; and,
(4) Ease of manufacture.

Appropriate dimensions for the separation (80) under typical operating conditions are as follows: maximum depth (84) of 1 mm, with separations bounded by projections such that separations have a width (82) of approximately 1.4 mm. Variations in these dimensions are appropriate depending on the specific process application, however, the height of the projections (78) should be within the range of 0.5-2 mm with the ratio of separation width (82) to depth (84) falling in the range of 1.2:1 to 3:1.

All three surface morphologies depicted in FIG. 3 are acceptable for my biomass carrier. However the preferred embodiment is Pattern A (12). Unlike the other two patterns B (16) and C (18), Pattern A provides 4 interfaces between thin and thick bio-film areas per separation. Under typical operating circumstances, the bio-film will be thinner at the projection tips and the centre of the separation than in the corner areas of the separation resulting in two such interfaces between tip and corner and two such interfaces between corner and centre per separation. This increased interface area provides a diffusion advantage. In addition, Pattern A is more easily produced to exact tolerances in the manufacturing process. Anoxic sites will be preferentially located in the separation corners (90).

The next consideration is the placement of defined morphologies in my biomass carrier (10). Many carriers employ a general tubular shape with one or more concentric rings and several radial partitions. This results in apertures that have a low aspect ratio (square-like or pie shaped). As with a pipe cross section, as bio-film grows, it reduces both the diameter for flow as well as the area of interface between the bio-film and the bulk liquid. Flow in tubular conduits (or apertures in this case) is proportional to the square of the diameter. As the diameter of the pipe decreases the rate and amount of bio-film growth also decreases due to: (1) a reduction in the flow diameter (and therefore flow velocities); and, (2) a reduction in the area for diffusion between bulk liquid and bio-film. With my biomass carrier the intention is to develop bio-films that are thicker, on average, than those possible with prior art carriers while at the same time maximizing the mass flow through the biomass carrier. However, with the use of a plurality of rectangular cells (46) there would normally be severe mass transfer problems through the carrier as the bio-film increased in thickness. To overcome this, I have introduced the benefits of flow between parallel plates, namely, the parallel walls of the cells (46). By introducing the projections (78) inside of each cell, the mass flow through each cell is optimized without the deleterious effects caused by an increase in bio-film thickness. For example, in the preferred embodiment (10) (momentarily ignoring the prominences), each cell (46) has a width (47) of approximately 4.1 mm and a length (49) of approximately 10 mm. This has the same hydraulic radius as a circular aperture 5.8 mm in diameter. In addition, as bio-film thickness increases, the deleterious effect on total bio-film/bulk fluid contact area is less pronounced than with lower aspect ratio apertures. In summary, for the intended application of this invention, surfaces can be most tightly spaced if apertures between the surfaces are elongated. This results in the ability to achieve higher specific surface area values without counterproductive mass transfer effects. It follows that opposing projections should be spaced apart as much as possible to maintain an open channel, to the extent possible.

The preferred embodiment (10) has spacing between the partitions (42) (ignoring projections) of 4.1 mm, however, values in the range of 3 to 6 mm are feasible for this embodiment depending on the specific process application and the dimensions selected for projections.

Finally, we address the overall configuration of the carrier (10). The overall size and aspect ratio of the carrier is based on several considerations:

(1) The need for dimensions large enough make the carrier practical to contain in a reactor with simple screens;
(2) The need for sufficient size and mass to encourage acceptable internal flow velocities in aerated biomass carrier reactors. Small, light carriers have low drag coefficients are more readily carried along with the water flow and consequently can have low internal flow velocities;
(3) The need for high fill fraction capability which is influenced by both size and aspect ratio; and,
(4) Practical manufacturing considerations particularly total protected surface area extrudable per machine per hour.

Consideration of the above factors in the light of practical experience has led to the selection of an overall size of 28.6 mm in length (50) by 21.9 mm in width (48). The cut thickness is dependant on the specific application and can vary from approximately 10 mm to 25 mm. Variations in the cross-sectional dimensions are permissible by including more or fewer of the patterned cells (46). For example, cells can be added to the length (50) of the profile.

The predetermined first aspect ratio of length to width is approximately 1.3:1, however, ratios up to 3:1 are considered to be practical. For example, a carrier designed on the basis of the upper or lower half of the preferred embodiment as depicted, would be acceptable and would have an aspect ratio of approximately 2.6:1.

The cells (46) should have high aspect ratios. However, there are practical limitations imposed by the manufacturing process such as the need for rigidity and uniform distance (41) between the vertical partitions in the carrier. In the preferred embodiment, the predetermined second aspect ratio is approximately 3:1. Values between 2.5 and 4.0 are acceptable and feasible. However, the distance (41) must conform to the guidelines stated above.

The carrier is preferably made from a plastic such as HDPE. However, the composition may optionally be amended by the addition of a UV retardant such as carbon black as well as other amendments designed to optimize the specific gravity. In recent experimental work, I have observed that the specific gravity of a biomass carrier has significant impact on the ability of the carrier to be entrained by water circulating throughout bioreactors. This effect is most pronounced at start-up before the media has wetted out and developed a significant bio-film or in process situations where bio-films are ordinarily thin. As bio-film develops, the natural buoyancy of the carrier is reduced and motion is enhanced. Nonetheless, there are numerous situations with conventional carriers where the amount of air required to move the media satisfactorily exceeds the amount required to fulfill biochemical requirements, resulting in a significant incremental expenditure of energy. An example would be a nitrification application, where the invention's large surface area and well protected niches will be advantageous for the growth of nitrifying bacteria but where average bio-film thickness can be expected to be small. In such situations, a carrier with optimized specific gravity can result in significant energy savings. Practical experience by this inventor has indicated that a specific gravity in the range of 0.975 and 0.995 with a preferred value of 0.985 being close to ideal for most applications.

Although the description above contains much specificity, these should not be construed as limiting the scope of the invention but as merely providing illustrations of some presently preferred embodiments of this invention. Thus the scope of the invention should be determined by the appended claims and their legal equivalents rather than by the examples given.

What is claimed is:

1. A biomass carrier for use in combination with a bioreactor for waste-water treatment, said biomass carrier comprising a rectangular body having an aspect ratio of between 1.3 to 1 and 3 to 1, said body adapted for mass transfer there through, the body further comprising a plurality of parallel vertical members and at least one horizontal member thereby forming an internal matrix of rectangular cells having an inside surface area, wherein each cell of said internal matrix of rectangular cells has an aspect ratio of between 2.5 to 1 and 4 to 1.

2. The biomass carrier of claim 1, wherein the body has an aspect ration of 2.6 to 1.

3. The biomass carrier of claim 1, wherein each cell of the internal matrix of rectangular cells has an aspect ratio of 3 to 1.

4. The biomass carrier of claim 1, wherein the internal matrix of rectangular cells comprises at least 12 cells.

5. The biomass carrier of claim 1, wherein each cell of the internal matrix of rectangular cell comprises a plurality of spaced internal projections covering not less than 70% of said inside surface area.

6. The biomass carrier of claim 5, wherein each projection of said plurality of spaced projections has a height and is separated by a separation distance and, wherein said height over said separation distance forms a ratio of between 1.2 and 3.

7. The biomass carrier as claimed in claim 6, the height is between 0.5 mm and 2.0 mm.

8. The biomass carrier as claimed in claim 6, wherein the separation distance is between 3 and 6 mm.

* * * * *